United States Patent
Wingfield

(10) Patent No.: US 7,103,047 B1
(45) Date of Patent: Sep. 5, 2006

(54) METHOD AND APPARATUS FOR MODIFYING THE RATE OF MPEG TRANSPORT STREAMS

(75) Inventor: Isaac Wingfield, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 946 days.

(21) Appl. No.: 10/072,625

(22) Filed: Feb. 6, 2002

Related U.S. Application Data

(60) Provisional application No. 60/301,232, filed on Jun. 26, 2001.

(51) Int. Cl.
- *H04L 12/28* (2006.01)
- *H04J 3/16* (2006.01)
- *H04J 3/22* (2006.01)

(52) U.S. Cl. .............. 370/395; 370/389; 370/468; 370/537

(58) Field of Classification Search ........ 370/230–329, 370/341–395, 431–473, 503–535; 709/232–236
See application file for complete search history.

(56) References Cited

U.S. PATENT DOCUMENTS

| | | | |
|---|---|---|---|
| 5,566,174 A * | 10/1996 | Sato et al. ............... 370/468 |
| 5,881,245 A * | 3/1999 | Thompson ................ 709/219 |
| 5,905,732 A * | 5/1999 | Fimoff et al. ............. 370/516 |
| 5,917,830 A * | 6/1999 | Chen et al. ............... 370/487 |
| 6,097,739 A * | 8/2000 | Yamashita ................ 370/528 |
| 6,219,358 B1 * | 4/2001 | Pinder et al. ............. 370/537 |
| 6,744,789 B1 * | 6/2004 | Michener .................. 370/509 |
| 6,788,710 B1 * | 9/2004 | Knutson et al. .......... 370/535 |
| 6,912,218 B1 * | 6/2005 | Jeon ......................... 370/392 |
| 2001/0024456 A1 * | 9/2001 | Zaun et al. ............... 370/535 |
| 2002/0118679 A1 * | 8/2002 | Eyer ........................ 370/389 |

\* cited by examiner

*Primary Examiner*—Man U. Phan
(74) *Attorney, Agent, or Firm*—Harrity Snyder LLP

(57) ABSTRACT

In a cable modem system, increasing or decreasing the rate of an MPEG Transport Stream involves two separate, but related, tasks: 1) incorporating a sufficient number of additional packets (or discarding packets) to make up for the difference in data rates between input and output, and 2) altering timing information (for instance, PCR (Program Clock Reference) values) present in some incoming packets to reflect their altered positions in the output stream. Both of these tasks can be facilitated by the use of a FIFO (First-In, First-Out) structure, through which the data flows.

39 Claims, 8 Drawing Sheets

METHOD AND APPARATUS FOR MODIFYING THE RATE OF MPEG TRANSPORT STREAMS

RELATED APPLICATIONS

This application claims priority from an earlier-filed provisional patent application Ser. No. 60/301,232, entitled "Method for Uprating MPEG Transport Streams" and filed on Jun. 26, 2001.

FIELD OF THE INVENTION

The present invention relates to broadband communications systems. More particularly, the present invention is directed to transporting streams of MPEG data in such communications systems.

BACKGROUND

Broadband communication systems such as cable modem systems offer users access to fast, high-bandwidth networks. A typical way of transporting data on such networks is based upon the well-known MPEG (Moving Pictures Expert Group) standard. The format of an MPEG packet header is shown in FIG. 1. Of note, is the PID (Packet ID) field, the PCR (Program Clock Reference) Flag field and PCR fields. When MPEG data is streamed in a continuous manner over a network, the resulting traffic is known as MPEG "Transport Streams". MPEG Transport Streams are commonly used in the Cable Television industry not only for transmitting digital video and audio, but also as a "carrier" for other kinds of digital data such as that used by Cable Modems adhering for example, to the DOCSIS standard. In order to transmit these digital bitstreams, they are imposed on RF carriers by using Quadrature Amplitude Modulation (QAM). For this to work properly, it is necessary for the data rate of the MPEG stream to correspond exactly to the QAM symbol rate. "64QAM" modulation indicates that there are 6 bits for every symbol being encoded while "256QAM" modulation indicates that there are 8 bits for every encoded symbol.

Some amount of digital video presently being delivered to consumers via HFC (Hybrid Fiber Coaxial Cable) is relayed from the point of origination to multiple cable headend sites via satellite link. In order to make the physical layer conversion simple, the payload rate of the satellite channel's QPSK (Quaternary Phase Shift Keying) modulated stream is made equal to the payload rate of a 64QAM stream that is used in a cable modem facility. Although the earliest digital set-top boxes were only 64QAM-capable, later ones, including all so-called "advanced" set-top boxes, are also able to handle 256QAM. The capacity of a 64QAM channel is about 27 Mbits/second and that of a 256QAM channel is nearly 39 Mbits/second, in North America. Converting the payload stream from the lower to the higher rate would make about 12 Mbits/second available for the transmission of additional data, in the same bandwidth.

In the past, this has required one of two things: 1) the QAM rate must be slaved to the incoming MPEG rate, or 2) the MPEG rate must be slaved to the QAM rate. Neither solution is particularly attractive, and especially so in larger systems, where clock distribution may be difficult to impossible. Further, in cases where the QAM stream must be maintained even if the connection to the source of the MPEG data is interrupted, some means must be provided to devolve to a locally provided QAM clock when necessary.

Alternately, some means may be provided to "rate-adjust" the incoming MPEG stream to match a locally clocked QAM symbol rate; while this technique works, previous implementations of it have been cumbersome and expensive.

SUMMARY OF THE INVENTION

In a cable modem system, both the input and output rates are external to the conversion process—the data is pushed from the MPEG source at one constant rate, and is pulled into the QAM unit at a different but still constant rate. Increasing or decreasing the rate of an MPEG Transport Stream involves two separate, but related, tasks: 1) incorporating a sufficient number of additional packets (or discarding packets) to make up for the difference in data rates between input and output, and 2) altering timing information (for instance, PCR (Program Clock Reference) values) present in some incoming packets to reflect their altered positions in the output stream. Both of these tasks can be facilitated by the use of a FIFO (First-In, First-Out) structure, through which the data flows. There are two cases of rate changing: 1) where the MPEG Transport Stream rate is less than the QAM rate and 2) where the MPEG Transport Stream rate is greater than the QAM rate.

DETAILED DESCRIPTION OF THE INVENTION

Figure 1:
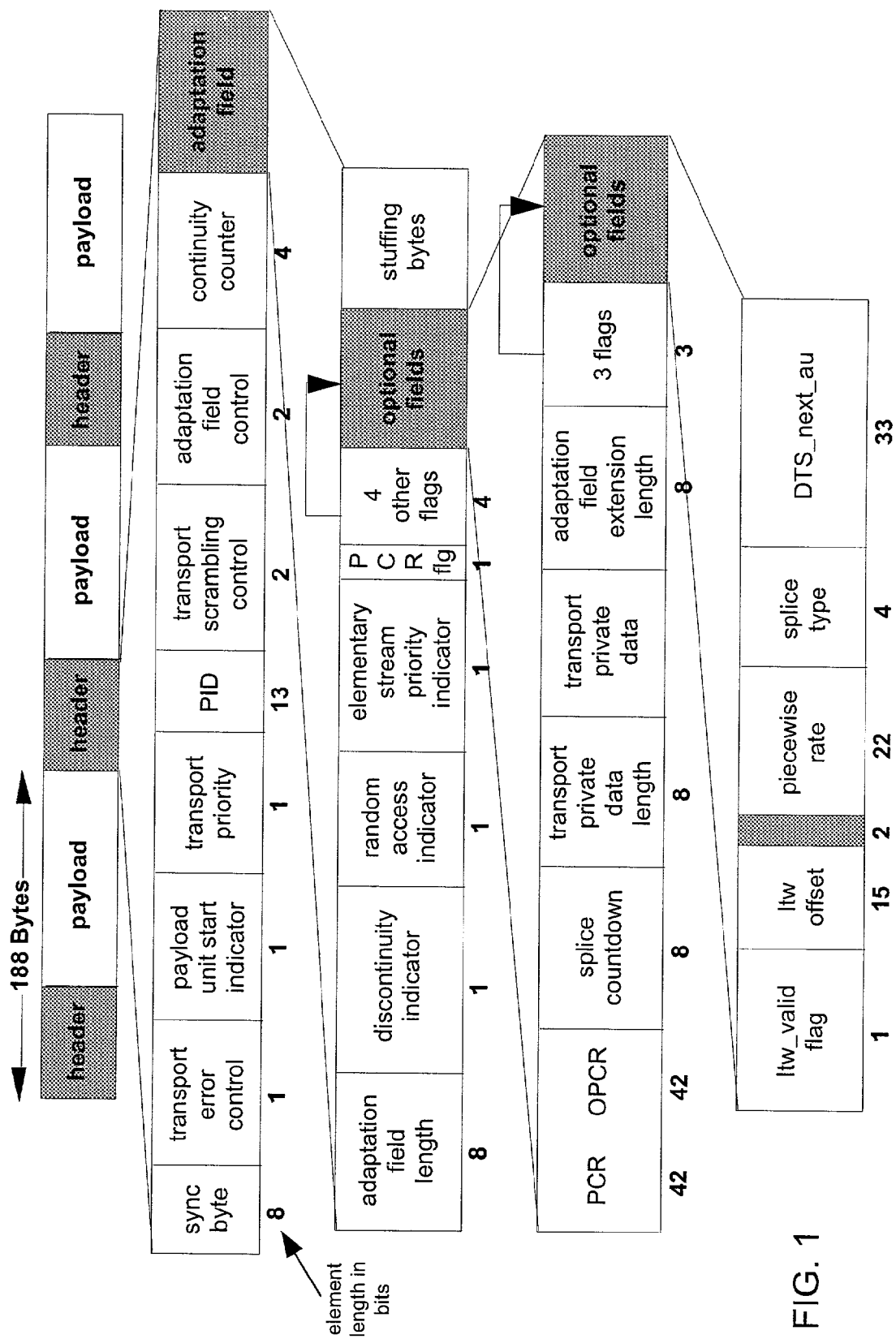
FIG. 1 is a diagram of an MPEG packet header.

In brief, the various embodiments of the invention are directed towards a fully digital implementation for an MPEG "rate changer" for MPEG Transport Streams. In accordance with the invention, the MPEG Rate Changer has the following features: 1) It is fully digital and functions by manipulating the bitstream, 2) requires no local phase-locked clock to operate, and 3) The complexity of the Rate Changer is independent of the number of elementary streams contained within the transport stream.

Changing the payload rate of an MPEG Transport Stream can be viewed as a special case of re-multiplexing. In a cable television system, both the input and output rates are external to the conversion process—the data is pushed from the MPEG source at one constant rate, and is pulled into the QAM unit at a different but still constant rate. Increasing or decreasing the rate of an MPEG Transport Stream involves two separate, but related, tasks: 1) incorporating a sufficient number of additional packets (or discarding packets) to make up for the difference in data rates between input and output, and 2) altering timing information (for instance, PCR (Program Clock Reference) values) present in some incoming packets to reflect their altered positions in the output stream. Both of these tasks can be facilitated by the use of a FIFO (First-In, First-Out) structure, through which the data flows. There are two cases of rate changing: 1) where the MPEG Transport Stream rate is less than the QAM rate and 2) where the MPEG Transport Stream rate is greater than the QAM rate.

For the packet-stuffing task, assume that there is a FIFO into which data is inserted precisely at the MPEG Transport Stream input rate, and from which data is extracted precisely at the QAM payload rate. Determining how and where to insert additional packets in order to convert the transport stream from a lower rate to the higher rate is as follows: 1) Fix a "watermark" at about the half-full point on the FIFO. When a packet arrives, if the FIFO is "less full" than the watermark, when inserting it into the FIFO, precede it by a "stuffing" packet. If the FIFO is "more full", insert the packet into the FIFO without a preceding "stuffing" packet. Whenever the FIFO becomes more than one packet shy of the watermark, insert another "stuffing" packet. Where the QAM rate is lower than the MPEG Transport Stream rate, the same watermarking procedure is used, but instead of inserting stuffing packets, packets are selectively discarded when the FIFO is more full than the watermark. When the FIFO is less full than the watermark, the packet is not discarded, but proceeds to the FIFO.

In accordance with the invention, no matter the rate of the incoming stream (but always less than the outgoing), an incoming packet will not be repositioned by more than one packet time at the output rate. Since only two QAM rates are currently in use in North American cable systems, the output data rate from the FIFO will be within a very small tolerance of one of those two values. The task of altering timing information such as PCR is discussed in greater detail below.

Figure 2:
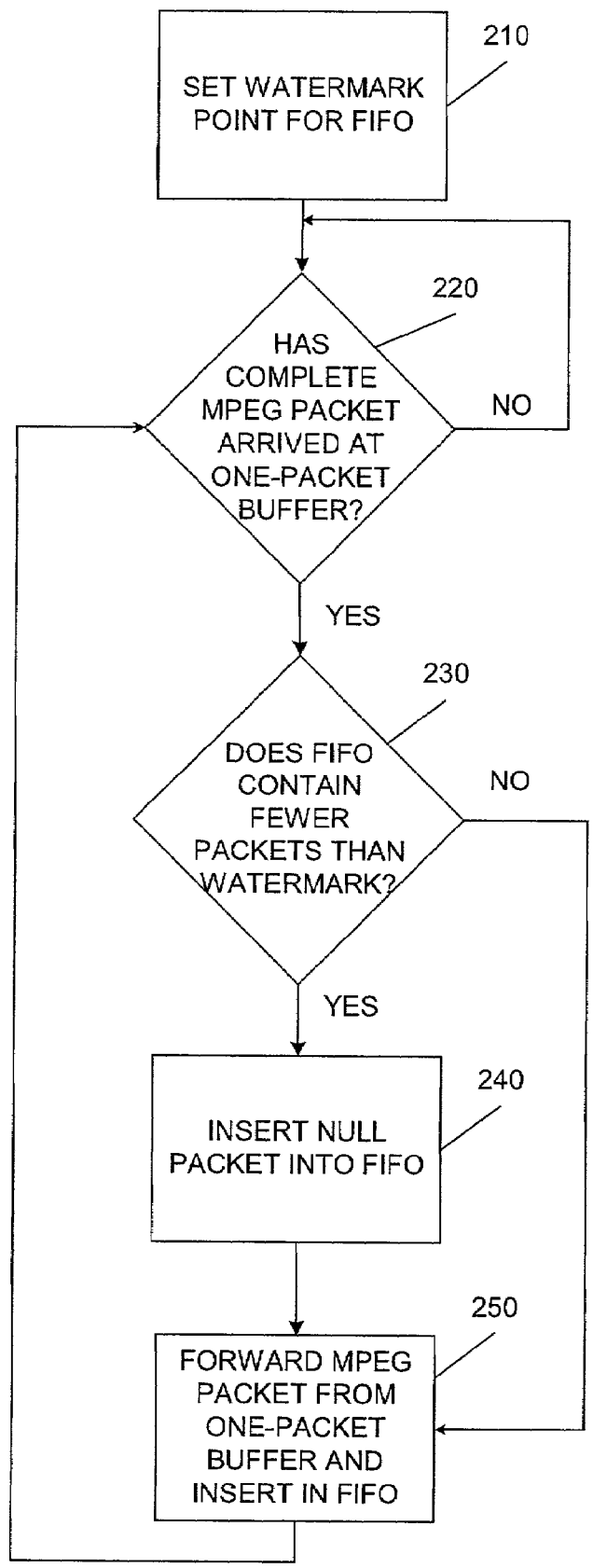
FIG. 2 is a flowchart illustrating packet stuffing where the QAM rate is higher than MPEG Transport Stream rate according to one or more embodiments of the invention.

FIG. 2 is a flowchart illustrating packet stuffing where the QAM rate is higher than MPEG Transport Stream rate according to one or more embodiments of the invention. First, according to block 210, a watermark point is established for the FIFO that is to stream packets out at the QAM rate. In at least one embodiment of the invention, the watermark point may be set at the half-way mark on the FIFO. For instance, if the FIFO had a capacity of 8 packets, then the watermark could be set at 4 packets. A one-packet buffer, as shown below, holds incoming MPEG packets prior to being placed in the FIFO pending a possible stuffing packet that may precede it into the FIFO. Once a complete MPEG packet (i.e. all of the bytes of the packet) has arrived at the one-packet buffer (persistent check, shown in block 220), then the state of the FIFO is compared to the watermark to see if there are fewer packets in the FIFO than the watermark (block 230). If there are not fewer packets in the FIFO than the watermark, then the MPEG packet in the one-packet buffer is forwarded and inserted into the FIFO without any stuffing packet (block 250). If there are fewer packets in the FIFO than the watermark, then a NULL (stuffing) packet is inserted into the FIFO (240). This NULL packet will precede the MPEG packet which is forwarded from the one-packet buffer and inserted into the FIFO after the NULL stuffing packet (block 250).

Figure 3:
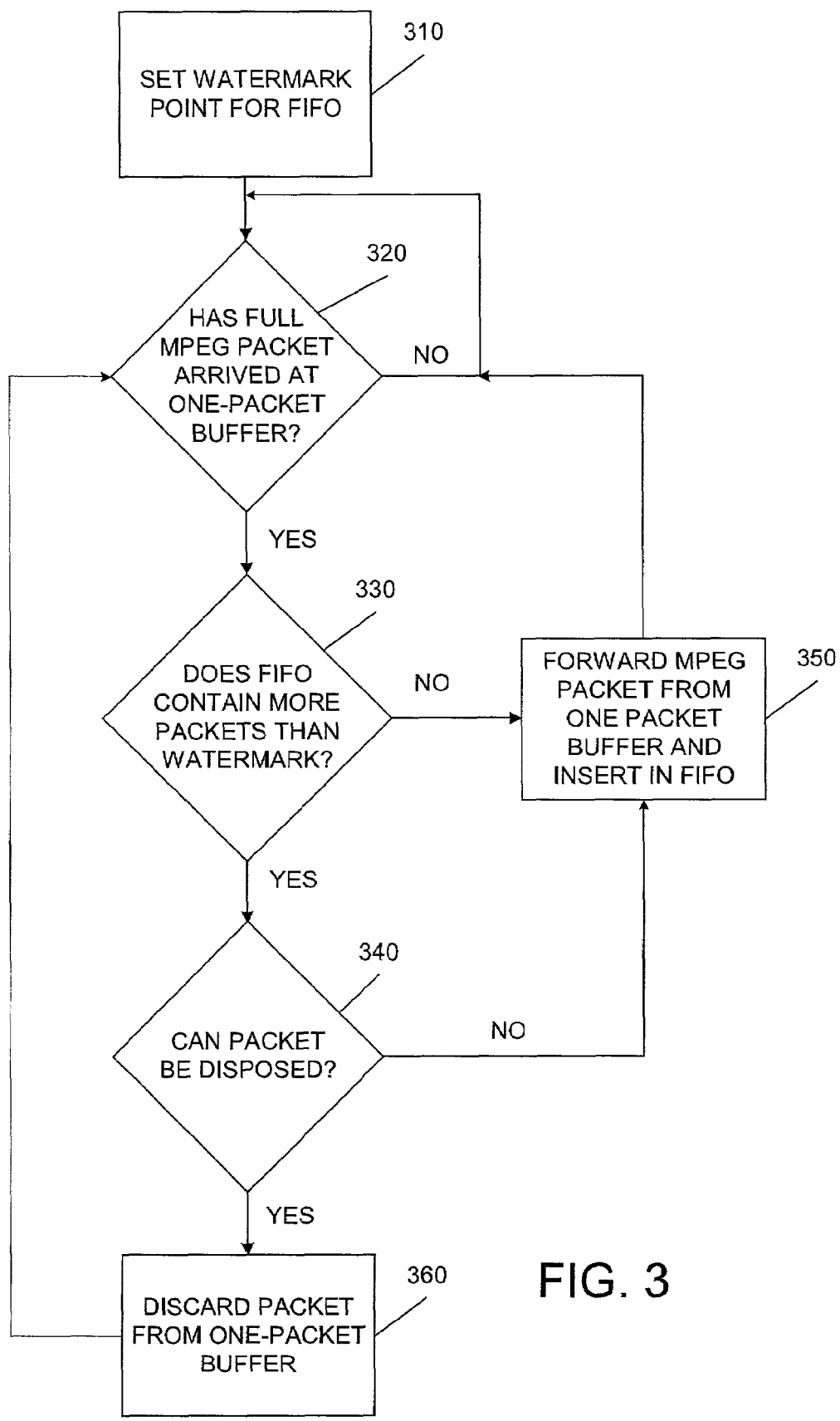
FIG. 3 is a flowchart illustrating packet deletion where the QAM rate is lower than MPEG Transport Stream rate according to one or more embodiments of the invention.

FIG. 3 is a flowchart illustrating packet stuffing where the QAM rate is lower than MPEG Transport Stream rate according to one or more embodiments of the invention. First, according to block 310, a watermark point is established for the FIFO that is to stream packets out at the QAM rate. As described above, in at least one embodiment of the invention, the watermark point may be set at the half-way mark on the FIFO. A one-packet buffer, as shown below, holds incoming MPEG packets prior to being placed in the FIFO pending a possible stuffing packet that may precede it into the FIFO. Once a complete MPEG packet (i.e. all of the bytes of the packet) has arrived at the one-packet buffer (persistent check, shown in block 320), then the state of the FIFO is compared to the watermark to see if there are more packets in the FIFO than the watermark (block 330). If there are not more packets in the FIFO than the watermark, then the MPEG packet in the one-packet buffer is forwarded and inserted into the FIFO without any stuffing packet (block 350). If there are more packets in the FIFO than the watermark, then the new packet in the one-packet buffer may be disposed of (not sent to the buffer). In order to dispose a packet, however, the packet must be one that can be disposed of. Thus, according to 340, a test is done to see whether the packet can be disposed of. If the MPEG packet in the one-packet buffer can be disposed of, it is discarded from the one-packet buffer and not inserted in the FIFO (block 360). If the MPEG packet in the one-packet buffer can not be disposed of, it is forwarded from the one-packet buffer and inserted into the FIFO (block 350).

In one embodiment, this test would involve comparing the PID (Packet ID) field in the header of the MPEG packet in the one-packet buffer with the list of disposable PIDs. If the PID is on the list of disposable PIDs, then the packet that the PID belongs to can be discarded. If the PID does not appear on the list of disposable PIDs, then the MPEG packet should not be discarded. The list of which packets (identified by their PIDs) may be compiled based upon application-specific or customer-specific consideration. A table can be created manually, e.g. by having knowledge about which program or programs are in the stream, but are not being offered to the cable system customers. Any "NULL" packets in the input stream can freely be discarded. For minor rate adjustments, other packets, carrying some of the MPEG "tables", for instance, may possibly be disposable.

Figure 4:
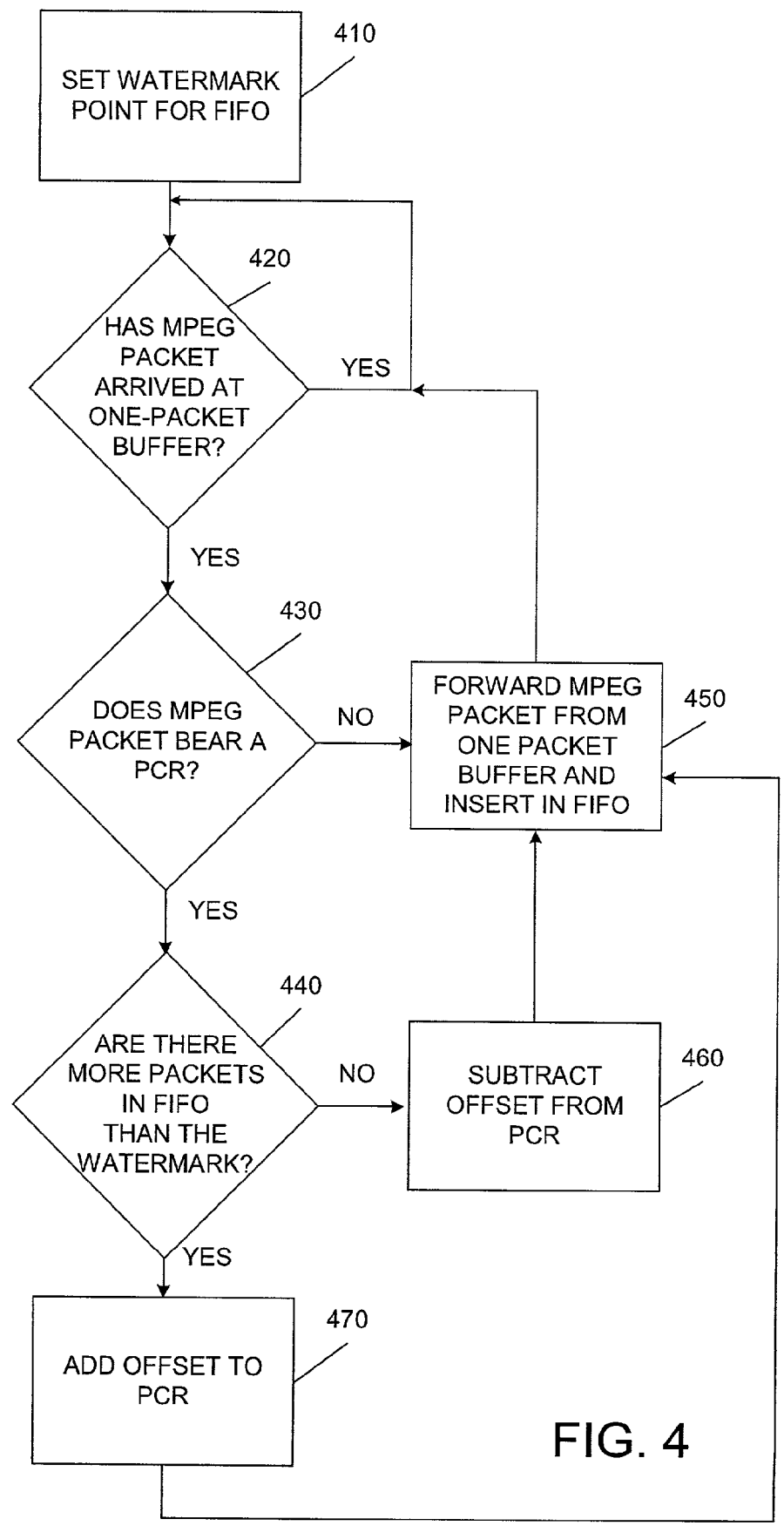
FIG. 4 is a flowchart illustrating altering of MPEG timing information according to one or more embodiments of the invention.

FIG. 4 is a flowchart illustrating altering of MPEG timing information according to one or more embodiments of the invention. An MPEG Transport Stream will bear one or more instances of the MPEG PCR which are samples of a continuously running clock associated with each MPEG encoder, and are used to enable MPEG decoder(s) to reconstruct timing accurately. Each clock is represented by a set of samples of a 27 MHz oscillator followed by a multi-bit register that accumulates counts of the 27 MHz source. Multiple non-synchronous PCR streams may be carried in a single MPEG Transport Stream. Although these samples can be in packets of almost any PID, there will be special data near the packet header, making them easy to locate. Referring to FIG. 1, if the "PCR flag" bit in the "Adaptation Field" can be checked to determine if it is set. If set, the PCR will comprise the 42 bits following the PCR flag and the four "other flag" bits. This makes it possible to discover all the PCR-bearing packets in an MPEG Transport Stream without regard to their PID. There is an intimate relationship between the value of a given PCR, the data rate of the aggregate MPEG Transport Stream, and the absolute location of the packet bearing it within the MPEG Transport Stream. Thus, if the packet's location in time is altered (for instance, by inserting a stuffing packet), then the value of the PCR sample is also altered, to correspond to this new position. Hence, static PCR information should be altered as packets arrive so that their timing values within the stream are synchronized with their initially encoded values. The altering process is as follows.

First, according to block 410, a watermark point is established for the FIFO that is to stream packets out at the QAM rate. As described above, in at least one embodiment of the invention, the watermark point may be set at the half-way mark on the FIFO. A one-packet buffer, as shown below, holds incoming MPEG packets prior to being placed in the FIFO pending a possible stuffing packet that may precede it into the FIFO. Once a complete MPEG packet (i.e. all of the bytes of the packet) has arrived at the one-packet buffer (persistent check, shown in block 420), the packet is inspected to see whether it bears PCR (Program Clock Reference) information (checked at block 430). A PCR flag in the MPEG packet header will indicate whether the packet bears PCR information in the header or not.

If the MPEG packet in the one-packet buffer does not bear a PCR (checked at block 430), it is forwarded from the one-packet buffer and inserted into the FIFO (block 450). If an MPEG packet bearing a PCR has arrived (checked at block 430), then the watermark is compared against the packets in the FIFO (block 440). If the FIFO is more full (i.e. more packets than the watermark), then a predetermined offset is added to the PCR value represented in the MPEG packet (block 470). If the FIFO is less full (i.e. less packets than the watermark), then that same predetermined offset is subtracted from the PCR value represented in the MPEG packet (block 460). After the PCR has been altered by either the addition or subtraction of the predetermined offset, the MPEG packet is then forwarded to and inserted in the FIFO (block 450).

The process 400 is an additional task to be performed over and above processes 200 and 300, thought they are shown as separate. The altering of timing information, namely, PCR information, must be performed in addition to other processes, even if for a given packet, no packets are stuffed or discarded. For instance, if a NULL packet is inserted preceding an MPEG packet, before the MPEG packet is inserted in the FIFO, if the packet bears PCR information and if other conditions discussed above hold true, the PCR information must first be altered. The altering of PCR information is a step which should precede the insertion of every PCR bearing packet where the above conditions are true.

Figure 5:
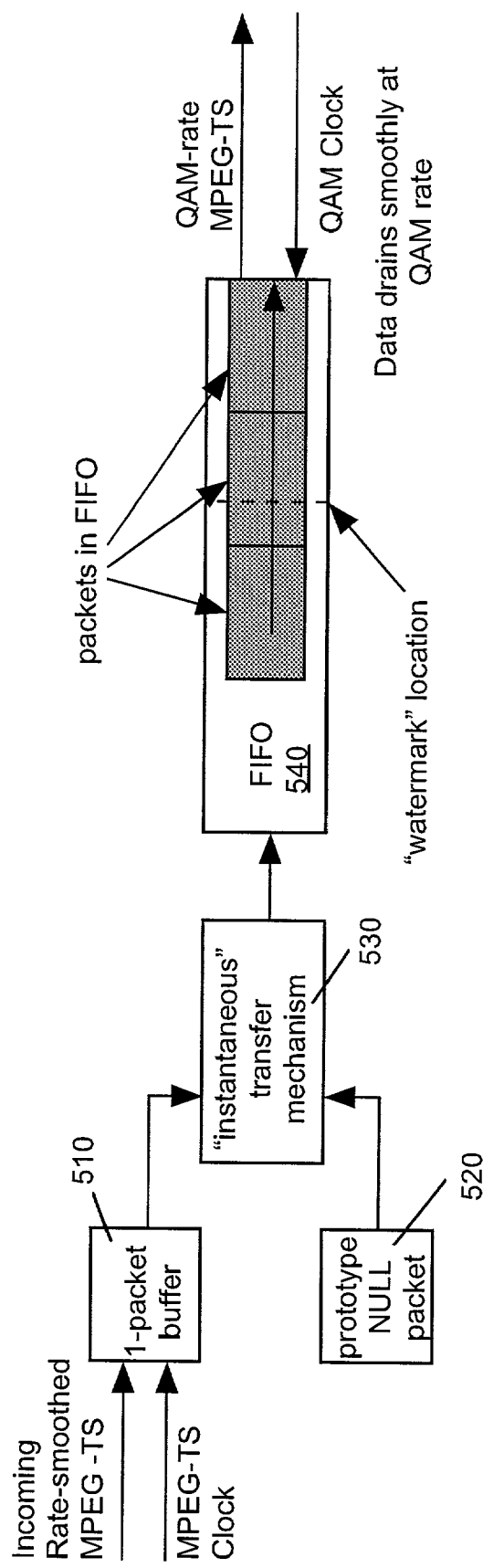
FIG. 5 illustrates a system for adjusting the MPEG Transport Stream where the incoming MPEG Transport Stream rate is less than the QAM rate.

FIG. 5 illustrates a system for adjusting the MPEG Transport Stream where the incoming MPEG Transport Stream rate less than the QAM rate. A one-packet buffer 510 is used as temporary storage for packets of an incoming MPEG Transport Stream which arrives at an "incoming" rate. For the packet-stuffing task, there is provided a FIFO 540 into which data is inserted precisely at the MPEG Transport Stream input rate, and from which data is extracted precisely at the QAM "payload" rate. Where the incoming rate is less than the QAM payload rate, the following packet stuffing mechanism is utilized.

A watermark, which may be for instance, the half-way or near half-way mark in the FIFO 540, is initially determined. As soon as a complete MPEG packet arrives at the one-packet buffer 510, the state of a FIFO 540 is checked against the watermark. If the FIFO is more full, i.e. has more packets than the watermark, then the MPEG packet currently residing in the one-packet buffer 510 is forwarded via an "instantaneous" transfer mechanism 530 (instantaneous in that it forwards with the least possible delay) to the FIFO 540 immediately following the last packet already resident in FIFO 540. If the FIFO is less full, i.e. has fewer packets than the watermark, then a prototype NULL (stuffing) packet is inserted in the FIFO 540 by transfer mechanism 530 first. After the NULL packet is inserted, then the MPEG packet resident in the one-packet buffer 510 is forwarded by transfer mechanism 530 to FIFO 540 such that it follows the NULL packet just inserted. This process continues for all packets that enter from the MPEG Transport Stream. The FIFO 540 receives a QAM clock signal as an input so that packets that are output by it are sent at the QAM rate. The system is continuous; packets are entering from the incoming Transport Stream and leaving the FIFO in continuous fashion. Since the MPEG Transport Stream rate is less than the FIFO 540 output rate, the NULL packets are used to bring the effective QAM rate of real MPEG data to match the incoming rate.

Figure 6:
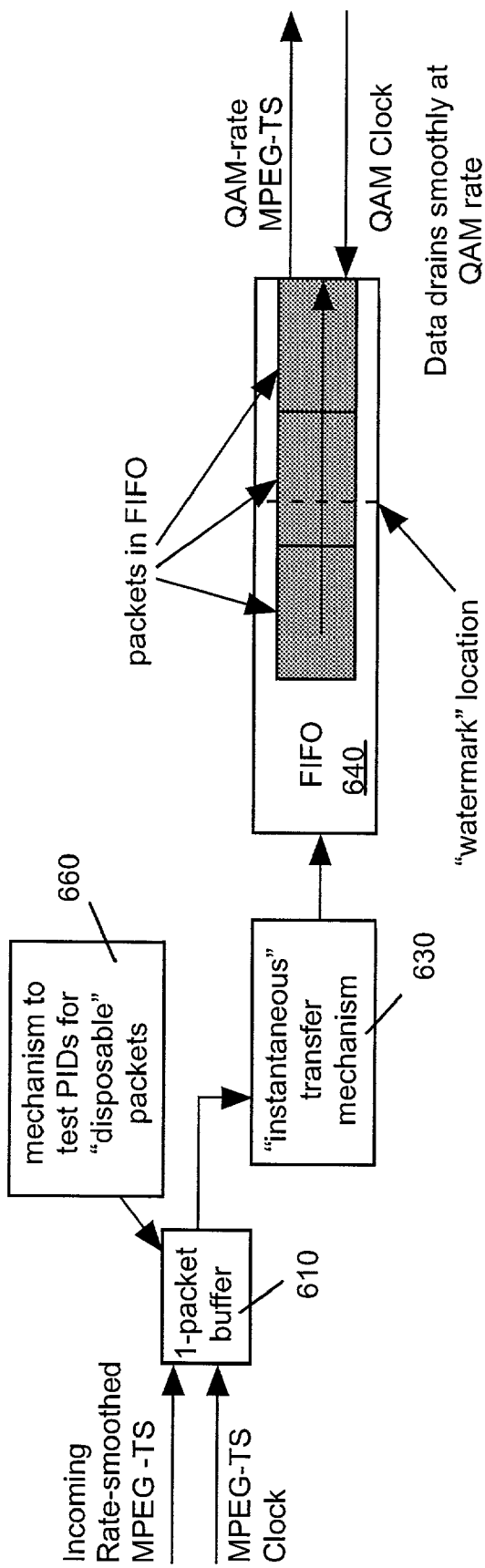
FIG. 6 illustrates a system for adjusting the MPEG Transport Stream where the incoming MPEG Transport Stream rate is greater than the QAM rate.

FIG. 6 illustrates a system for adjusting the MPEG Transport Stream where the incoming MPEG Transport Stream rate greater than the QAM rate. A one-packet buffer 610 is used as temporary storage for packets of an incoming MPEG Transport Stream which arrives at an "incoming" rate. For the packet-stuffing task, there is provided a FIFO 640 into which data is inserted precisely at the MPEG Transport Stream input rate, and from which data is extracted precisely at the QAM "payload" rate. Where the incoming rate is greater than the QAM payload rate, the following packet discarding mechanism is utilized. A watermark, which may be for instance, the half-way or near half-way mark in the FIFO 640, is initially determined. As soon as a complete MPEG packet arrives at the one-packet buffer 610, the state of a FIFO 640 is checked against the watermark. If the FIFO is more full, i.e. has more packets than the watermark, then the MPEG packet currently residing in the one-packet buffer 610 is tested by a testing mechanism 660 to see if the packet can be disposed of. As mentioned above, the testing mechanism 660 may use a list of PIDs (Packet IDs) that are approved to be disposed and compare that with the PID of the packet resident in buffer 610. In addition or alternatively, if a packet is discovered to be a NULL packet, it can be discarded. If the testing mechanism determines that the packet in buffer 610 is disposable, the packet is discarded (i.e. never forwarded to FIFO 640). If the testing mechanism determines that the packet in buffer 610 is not disposable, the packet is forwarded to the FIFO 640 immediately following the last packet already resident in FIFO 640 via transfer mechanism 630. If the FIFO is less full, i.e. has fewer packets than the watermark, then the MPEG packet resident in the one-packet buffer 610 is forwarded by transfer mechanism 630 to FIFO 640 without any testing for discard.

This process repeats and continues for all packets that enter from the MPEG Transport Stream. The FIFO 640 receives a QAM clock signal as an input so that packets that are output by it are sent at the QAM rate. The system is continuous; packets are entering from the incoming Transport Stream and leaving the FIFO in continuous fashion. Since the MPEG Transport Stream rate is greater than the FIFO 640 output rate, packets are disposed of to bring the effective rate of real MPEG transport to match the QAM rate.

Figure 7:
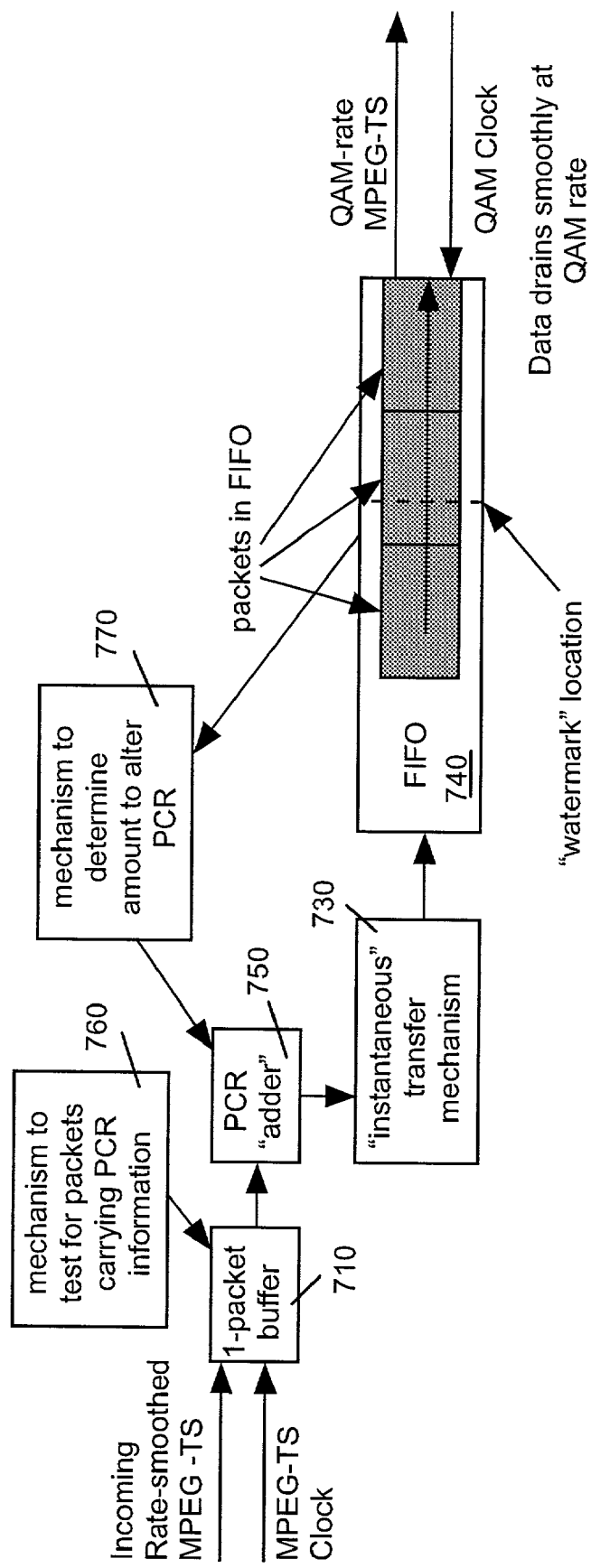
FIG. 7 illustrates a system for altering timing information of an MPEG Transport Stream where the incoming rate is not equal to the QAM payload rate.
Figure 8:
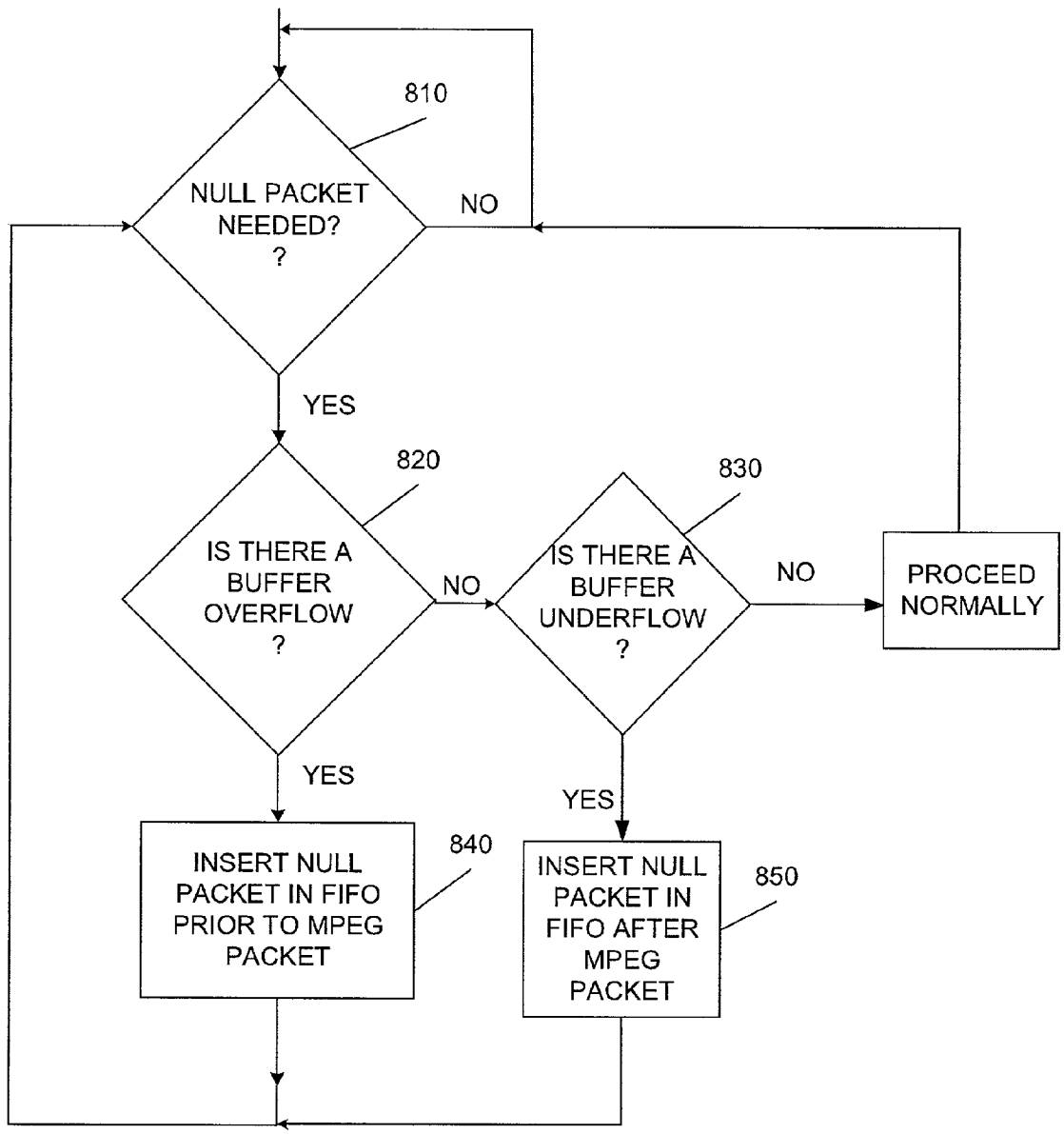
FIG. 8 illustrates a process to trap and correct for possible underflow and underflow of the rate buffer in a standards-compliant MPEG decoder according to one or more embodiments of the invention.

FIG. 7 illustrates a system for altering timing information of an MPEG Transport Stream where the incoming rate is not equal to the QAM payload rate. A one-packet buffer 710 is used as temporary storage for packets of an incoming MPEG Transport Stream which arrives at an "incoming" rate. For the timing information altering task, there is provided a FIFO 740 into which data is inserted precisely at the MPEG Transport Stream input rate, and from which data is extracted precisely at the QAM "payload" rate. In this embodiment, the timing information includes PCR information that is contained within certain MPEG packets in the incoming MPEG Transport Stream. A watermark, which may be for instance, the half-way or near half-way mark in the FIFO 740, is initially determined. As soon as a complete MPEG packet arrives at the one-packet buffer 710, a mechanism 760 checks to see whether the MPEG packet therein contains PCR (timing) information. As discussed above, a PCR Flag within the packet header can be tested to see if the packet bears PCR information or not. If the packet bears PCR information, then the state of a FIFO 740 is checked against the watermark.

If the FIFO is more full, i.e. has more packets than the watermark, then the PCR-bearing MPEG packet currently residing in the one-packet buffer 710 is altered by adding an offset to the PCR value. If the FIFO is less full, i.e. has more packets than the watermark, then the PCR-bearing MPEG packet currently residing in the one-packet buffer 710 is altered by subtracting an offset to the PCR value. The adding and subtracting of offsets is achieved by passing the packet in the one packet buffer through a PCR adder 750. A mechanism 770 to determine what the offset should be outputs the offset value to the PCR adder 750.

A positive offset value would be sent from mechanism 770 to PCR adder 750 in case the FIFO is more full, and a negative offset will be sent from mechanism 770 to PCR adder 750. The precise value of the offset is a function of the QAM rate and since there are two types of QAM modulation (64QAM and 256QAM) currently used, there are two possible QAM rates. Mechanism 770 determines by reference to the QAM clock signal input to the FIFO 740 whether it is 64QAM or 256QAM.

Once the PCR value of a PCR-bearing packet is altered, the packet is then forwarded by transfer mechanism 730 and inserted into FIFO 740. As stated above, the system for altering of PCR values is part and parcel of the systems of FIGS. 5 and 6. Whether the QAM rate is higher or lower than the incoming MPEG Transport Stream rate, and thus, whether packets may need to be inserted or discarded, respectively, the altering of PCR values would need to be implemented alongside the other systems and their associated mechanisms. Where a packet was to be discarded, the altering of PCR values for that packet, if needed, could also be skipped as a measure of efficiency.

In order to arrive at an offset value that can be added or subtracted, assume that for the incoming MPEG stream, the relationship between each set of PCR values and their packet locations is correct. It is possible to use the QAM bitrate as a "clock" to correct PCR values whenever PCR-bearing packets must be displaced in time due to the addition of "stuffing" packets. For instance, for 64QAM, the correction is approximately 1.001855 PCR ticks per QAM bit, and for 256QAM, the correction is approximately 0.692308 ticks per bit.

So in order to alter PCR values, identify packets bearing PCRs, and when storing the PCR-bearing packet in the FIFO, alter the PCR by 1.001855 ticks per bit offset from the watermark for 64QAM or 0.692308 ticks per bit offset from the watermark for 256QAM. Since the value in the PCR field is an integer, and the actual correction value will generally not be, a precomputed table mapping corrections against offset values might also be implemented in alternate embodiments. The table could be constructed so as to prevent any accumulated "zero drift", if necessary. Note that each PCR correction stands alone. No "history" or tracking of the possibly multiple PCR streams is necessary. Since each PCR is corrected independently of others, no long-term drift or roundoff or other error is expected to accumulate. The offsets again are added if the FIFO is more full, and subtracted if the FIFO is less full than the watermark.

One additional procedure which may need to implemented is a buffer control process to trap and correct for possible underflow and underflow of the "rate buffer" in a standards-compliant MPEG decoder. Although displacing packets, even by as little as one packet time (due to the added "stuffing" packets), implies the possibility of loss of decoder buffer control with consequent under- or over-flow, this is considered unlikely. In the event it manifests itself on real-world streams, the solution is to alter the relative positions of a packet of "real" data and its accompanying "stuffing" packet. According to block 810, the process need not be performed if the current state of the FIFO indicates that a NULL packet is not needed. According to block 820, a check is performed (which may be persistent via a flag or trap or other such mechanism) to see if there is the possibility of buffer overflow or underflow. If so, according to block 840 the NULL packet can be inserted before the full MPEG packet. If not, and if there is underflow in the FIFO (checked at block 830), the NULL packet can be inserted after the full MPEG packet (block 850). If there is neither an underflow nor an overflow condition, then the rate adjustment process proceeds normally.

Although the present invention has been described in detail with reference to the disclosed embodiments thereof, those skilled in the art will appreciate that various substitutions and modifications can be made to the examples described herein while remaining within the spirit and scope of the invention as defined in the appended claims. Also, the methodologies described may be implemented using any combination of software, specialized hardware, firmware or a combination thereof and built using ASICs, dedicated processors or other such electronic devices.

What is claimed is:

1. A method of adapting an effective rate of an MPEG transport stream originating with an incoming rate to a payload rate, said MPEG transport stream having a sequence of MPEG packets, said method comprising:
    maintaining identifiers that identify MPEG packets that can be discarded;
    altering timing information in said MPEG packets that bear said timing information;
    inserting stuffing packets into said MPEG transport stream when said incoming rate is less than said payload rate; and
    discarding certain packets from said MPEG transport stream using at least one of the identifiers when said incoming rate is greater than said payload rate.

2. A method of adapting an effective rate of an MPEG transport stream originating with an incoming rate to a payload rate, said MPEG transport stream having a sequence of MPEG packets, said method comprising:
    maintaining identifiers that identify MPEG packets that can be discarded;
    altering timing information in said MPEG packets that bear timing information;
    inserting stuffing packets into said MPEG transport stream when said incoming rate is less than said payload rate;

discarding certain packets from said MPEG transport stream using said maintained identifiers when said incoming rate is greater than said payload rate; and forwarding non-discarded MPEG packets after said altering and said inserting into a FIFO that outputs packets at said payload rate.

3. A method according to claim 2 further comprising:

temporarily storing each MPEG packet from said MPEG transport stream in a one-packet buffer prior to forwarding; and waiting until said one-packet buffer contains a complete one of said MPEG packets before performing said altering, said inserting, or said discarding.

4. A method according to claim 3 further comprising: setting a watermark for said FIFO.

5. A method according to claim 4 further comprising: determining which of said MPEG packets bears said timing information.

6. A method according to claim 5 wherein said timing information comprises a Program Clock Reference (PCR) value.

7. A method according to claim 6 wherein altering timing information comprises:

adding an offset to said PCR value when a number of packets in said FIFO exceeds said watermark when said one-packet buffer contains a complete MPEG packet; and subtracting said offset when said number of packets in said FIFO is less than said watermark when said one-packet buffer contains a complete MPEG packet.

8. A method according to claim 7 wherein said offset varies in accordance with said payload rate.

9. A method according to claim 8 wherein said payload rate is a Quadrature Amplitude Modulation (QAM) rate.

10. A method according to claim 9 wherein said offset is 1.001855 ticks per bit for a QAM rate corresponding to 64QAM modulation.

11. A method according to claim 9 wherein said offset is 0.692308 ticks per bit for a QAM rate corresponding to 256QAM modulation.

12. A method according to claim 4 wherein said inserting stuffing packets is performed when said FIFO contains a number of packets that is less than said watermark when said one-packet buffer contains a complete MPEG packet.

13. A method according to claim 8 wherein a single stuffing packet is inserted into said FIFO prior to forwarding said complete MPEG packet from said one-packet buffer.

14. A method according to claim 4 wherein said discarding MPEG packets is performed when said number of packets in said FIFO exceeds said watermark and when said one-packet buffer contains a complete MPEG packet.

15. A method according to claim 14 wherein said discarding comprises:

determining whether the complete MPEG packet in said one-packet buffer can be discarded based on said identifiers; and discarding said complete MPEG packet when said complete MPEG packet can be discarded.

16. A method according to claim 15 wherein said identifier includes a packet ID (PID) and wherein said determining comprises:

comparing said PID of said complete MPEG packet with a list of disposable PIDs;

determining whether said PID is on said list; and discarding said complete MPEG packet when said PID of said complete MPEG packet is on said list.

17. A method according to claim 16 wherein determining whether said complete MPEG packet can be discarded further comprises:

determining if said complete MPEG packet is a stuffing packet; and discarding said complete MPEG packet when the complete MPEG packet is a stuffing packet.

18. A method according to claim 2 wherein said stuffing packets are NULL packets.

19. A system of adapting an effective rate of an MPEG transport stream originating with an incoming rate to a payload rate, said stream having a sequence of MPEG packets, said system comprising:

logic configured to assign identifiers that identify MPEG packets that can be discarded;

a timing information detection mechanism to determine if said packets include timing information;

a timing information altering mechanism configured to alter timing information in packets containing timing information;

a one-packet buffer accepting said MPEG packets from said stream;

a FIFO configured to receive altered timing information, said FIFO further configured to receive packets from said one-packet buffer and to output packets at said payload rate, said FIFO including a watermark; and an instantaneous transfer mechanism coupled between said one-packet buffer and said FIFO, said transfer mechanism forwarding a packet from said one-packet buffer when a first condition is present, stuffing a NULL packet into said FIFO when a second condition is present, or dropping said packet based on one of the identifiers when a third condition is present.

20. A system according to claim 19 wherein said incoming rate is less than said payload rate.

21. A system of adapting an effective rate of an MPEG transport stream originating with an incoming rate that is less than a payload rate, said stream having a sequence of MPEG packets, said system comprising:

a timing information altering mechanism configured to alter timing information packets containing timing information;

a FIFO configured to receive altered timing information when present, said FIFO further configured to output packets at said payload rate, said FIFO including a watermark;

a one-packet buffer accepting said MPEG packets from said stream;

an instantaneous transfer mechanism coupled between said one-packet buffer and said FIFO, said transfer mechanism forwarding a packet from said one-packet buffer when a first condition is present, wherein the first condition occurs when said FIFO contains a number of packets that is below said watermark, and said transfer mechanism inserting a NULL packet into said FIFO when a second condition is present.

22. A system according to claim 21 wherein said timing information includes a Program Clock Reference (PCR) value.

23. A system according to claim 21 wherein said second condition occurs when said FIFO contains a number of packets that is greater than said watermark when said one-packet buffer contains a complete MPEG packet.

24. A system according to claim 21 wherein said timing information altering mechanism comprises:

a mechanism to test for packets carrying timing information, said mechanism to test coupled to said one-packet buffer;

a mechanism to determine an amount by which said timing information should be altered, said mechanism to determine coupled to said FIFO; and a mechanism to alter said timing information by said amount, said mechanism to perform coupled to said mechanism to determine.

25. A system according to claim 24 wherein said mechanism to determine receives said payload rate and determines said amount based upon said payload rate and a state of said FIFO in relation to said watermark when said complete MPEG packet arrives in said one-packet buffer.

26. A system according to claim 25 wherein said mechanism to alter adds said amount to said timing information.

27. A system according to claim 26 wherein said amount is greater than zero when the number of packets in said FIFO exceeds said watermark when said complete MPEG packet arrives in said one-packet buffer.

28. A system according to claim 26 wherein said amount is less than zero when the number of packets in said FIFO exceeds said watermark when said complete MPEG packet arrives in said one-packet buffer.

29. A system of adapting an effective rate of an MPEG transport stream originating with an incoming rate to a payload rate, said stream having of a sequence of MPEG packets, said system comprising:

a timing information altering mechanism configured to alter timing information in packets containing timing information:

a FIFO to output packets at said payload rate, said FIFO including a watermark;

a buffer to accept said MPEG packets from said stream;

an instantaneous transfer mechanism coupled between said buffer and said FIFO, said mechanism to forward a packet from said buffer to said FIFO when a first condition is present or to stuff a NULL packet into said FIFO when a second condition is present; and a mechanism to discard a packet in said buffer when a third condition is present, said discarded packet not forwarded to said FIFO.

30. A system according to claim 29 wherein said incoming rate exceeds said payload rate.

31. A system according to claim 30 wherein said first condition is present when said FIFO contains a number of packets that is below said watermark when said buffer contains a complete MPEG packet.

32. A system according to claim 31 wherein said timing information includes a Program Clock Reference (PCR) value.

33. A system according to claim 31 wherein said third condition occurs when said FIFO contains a number of packets that exceeds said watermark when said buffer contains a complete MPEG packet, said third condition further identifying whether said packet can be disposed of.

34. A system according to claim 31 wherein said timing information altering mechanism comprises:

a mechanism to test for packets carrying timing information, said mechanism to test coupled to said buffer;

a mechanism to determine an amount by which said timing information should be altered, said mechanism to determine coupled to said FIFO; and a mechanism to alter said timing information by said amount, said mechanism to perform coupled to said mechanism to determine.

35. A system according to claim 34 wherein said mechanism to determine receives said payload rate and determines said amount based upon said payload rate and a state of said FIFO with respect to said watermark when said complete MPEG packet arrives in said buffer.

36. A system according to claim 35 wherein said mechanism to alter adds said amount to said timing information.

37. A system according to claim 36 wherein said amount is greater than zero when the number of packets in said FIFO exceeds said watermark when said complete MPEG packet arrives in said buffer.

38. A system according to claim 36 wherein said amount is less than zero when the number of packets in said FIFO exceeds said watermark when said complete MPEG packet arrives in said buffer.

39. A system according to claim 33 further comprising:

a mechanism to test whether said packet in said buffer can be disposed of in support of checking said second condition.

* * * * *